United States Patent Office 2,911,613
Patented Nov. 3, 1959

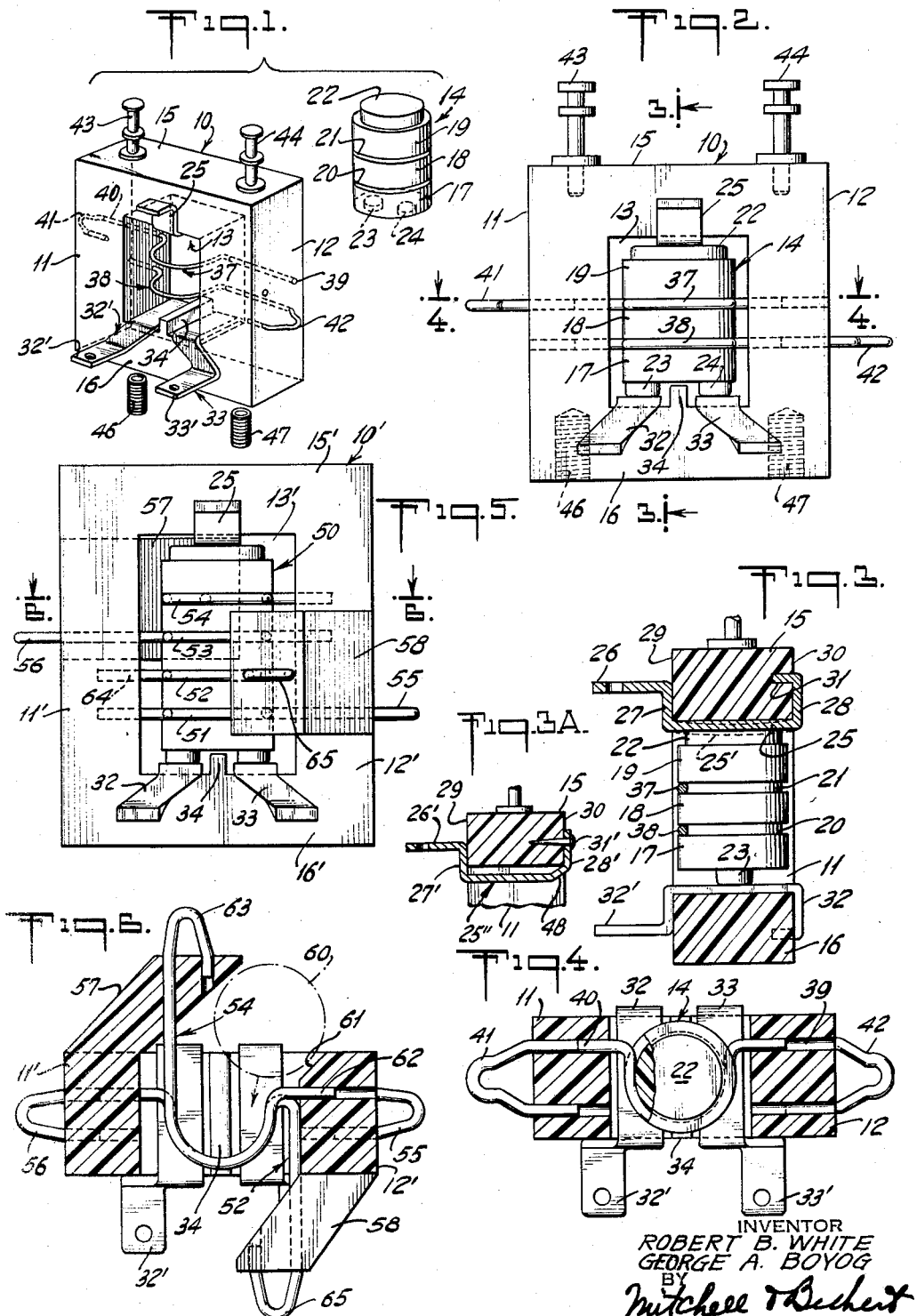

2,911,613

MOUNT FOR ELECTRON-DISCHARGE DEVICE

Robert B. White, Millbrook, and George A. Boyog, Mingoville, Pa., assignors to Community Engineering Corporation, State College, Pa., a corporation of Pennsylvania Application July 18, 1957, Serial No. 672,703

14 Claims. (Cl. 339—182)

Our invention relates to an improved tube socket or mount, as for the rugged removable support of a so-called disc-type vacuum tube.

It is an object of the invention to provide an improved device of the character indicated.

It is another object to provide an improved mount for a disc-type vacuum tube in which the predominant supporting pressures are in direct, substantially axially aligned, relation with the axis of the tube.

It is also an object to provide an improved support for a disc-type tube in which the supporting forces are characterized by substantially no net radial component.

Another object is to meet the above objects with a tube support which is able to substantially shield the entire mounted vacuum tube from mechanical shock.

It is a further object to achieve the above objects with a structure in which separate electrode connections to a disc-type vacuum tube are made to essentially wholly different sides of the mount, whereby maximum isolation is achieved between the electrode connections themselves and between circuit elements to which the different electrodes of a given vacuum tube are connected.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a partially disassembled perspective view of a vacuum-tube mount of the invention, with a disc-type vacuum tube shown separate from the mount and ready for removable insertion therein;

Fig. 2 is a front elevation of the mount of Fig. 1, with the vacuum tube mounted therein;

Fig. 3 is a sectional view, taken generally along the alignment 3—3 of Fig. 2;

Fig. 3A is a fragmentary view similar to Fig. 3 and illustrative modification of a part thereof;

Fig. 4 is a sectional view in the plane 4—4 of Fig. 2;

Fig. 5 is a view similar to Fig. 2, but showing a modification; and

Fig. 6 is a sectional view in the plane 6—6 of Fig. 5.

Briefly stated, our invention contemplates an improved support or mount for disc-type vacuum tubes. Such vacuum tubes are generally cylindrical and are characterized by an anode-connection member or button at one longitudinal end, and by two filament-connection members or buttons at the opposite longitudinal end, all other electrode connections being made at intermediate locations, for which connection contact is available for the full circumference of the tube.

According to our invention, an improved mount for such tubes comprises a peripherally continuous yoke having a central opening to receive the tube. A single anode contact or terminal member is supported at one longitudinal end of the opening, and filament terminal members are supported at the other longitudinal end. Slight axial resiliency is available in one or more of these contact members whereby, upon insertion of the vacuum tube in the mount, there is complete symmetry of axially preloaded retaining force, for holding the tubes in place. For connection to the intermediate electrode terminals, which extend circumferentially about the tube, we provide resilient terminal members having extensive arcuate shape, facing out on the same side of the opening in the mount, for accommodation of an inserted tube. Each of these intermediate terminal members is preferably supported by both sides or arms of the yoke, while the lead connections thereto project outwardly from different sides of the yoke. For disc-type vacuum tubes in which the number of intermediate electrode connections exceed two, we provide the yoke with offsetting arms to support additional terminal members. In every case, the open side of the extensively arcuate parts of the terminal members faces out the same side of the yoke opening.

Referring to Figs. 1 to 4 of the drawings, our invention is shown in application to a tube mount characterized by a yoke 10 of generally rectangular prismatic configuration, and comprising essentially two spaced elongated side arms 11—12 on opposite sides of a central opening 13, in which a disc-type tube 14 is removably received. The yoke may be of suitable dielectric plastic, such as polystyrene, tennite, epoxy resin, or the like, and is rendered completely rigid and peripherally continuous by means of integral end closure arms 15—16. The disc-type tube is characterized externally by a plurality of separate cylindrical ceramic discs 17—18—19 spaced by recesses 20—21, at which contact may be had with peripherally extending disc-type intermediate electrodes, as at the cathode contact or terminal member 20 and at the grid contact or terminal member 21. End-electrode connections are made at an anode button 22 and at two spaced filament buttons 23—24 at the opposite axial ends.

For connection to the various possible terminals of the tube 14, we provide a first anode-connection member or strip 25 supported at the upper end of the opening 13. In Fig. 3, the anode-connection member 25 is shown to include a laterally projecting circuit-connection or terminal portion 26, and two offsetting portions 27—28, whereby the member 25 may be secured to the opposite faces 29—30 of the upper yoke arm 15. A key lug 31 on the member 25 securely anchors the same in place. The anode-connection member 25 may be initially formed with a slight arch, suggested by dashed line 25', whereby slight axial yielding is available for resiliently preloading the tube via the anode button 22 thereof (when inserted); member 25 may be of beryllium copper.

In the modified form shown in Fig. 3A, the anode-connection member is again a strip of resilient conductive metal such as beryllium copper, but its retention on the yoke arm 15 is by means of a transverse pin 31; driven through the offset portion 28'. The central or terminal-contact portion between offsets 27'—28' is preferably spaced from the adjacent inner wall surface of the yoke arm 15, and an initial slope or ramp 48 in said central contact portion facilitates tube insertion. Upon the insertion of a tube 14, the offset 27' and connection lug 26' are free to ride up on the surface 29, as the anode button 22 compresses the bowed central portion of strip 25".

At the opposite longitudinal end of the opening 13, the lower end arm 16 supports two filament-button contact strips 32—33, which may also be of beryllium copper and generally of the formation described for the case of the anode-contact strip 25. The two strips 32—33 have circuit-connection projections or lugs 32'—33' extending out of the plane of the yoke 10 and on the same side as for the case of the circuit connection 26 of the anode terminal strip 25, and these lugs 32'—33' are preferably spread apart or laterally offset from each so as to facilitate the making of circuit connections. In the form shown, an integral insulating bridge or guide 34 is formed in the lower connection arm 16 so as to divide the two connection strips 32—33 from each other and so as to make sure that the tube will always be inserted in the correct orientation, with proper separate connections established at 23—32 and at 24—33.

In accordance with the invention, intermediate terminal connections are made to the electrodes 20—21 by way of separate connection members 37—38, each of which is preferably supported by both side members 11—12 of the yoke. Both connection members 37—38 include substantial arcuate bowed central portions for correspondingly extensively arcuate contact with the electrode terminals 20—21 of the tube 14, and both bowed parts of members 37—38 preferably face outwardly towards the same side of the opening 13; as viewed in Fig. 1, the bowed arcs of members 37—38 face away from the viewed side. Each of the members 37—38 may be a single conducting piece of wire preferably heat-tempered and silver-plated, and received at generally opposed parts of the yoke arms 11—12; for example, the ends of member 37 are guided in openings 39—40 in the yoke arms 11—12. The terminal member 37 includes an externally projecting portion or lug 41 for establishing electrical contact with other circuit elements, and such portion 41 projects preferably to one side of the yoke to the exclusion of the other. In like manner, a similar outwardly projecting portion 42 is provided on the terminal member 38, projecting on the opposite side of the yoke 10. This construction will be appreciated as facilitating separate circuit connections at 41—42 which are as remote as possible from each other, thereby promoting electrical isolation and reduced coupling between the circuits concerned.

To complete the structure shown for Figs. 1 to 4, we find it convenient to provide anchoring posts 43—44 which may be embedded in the yoke 10, as for example, on the top side thereof, so that any lead connection made to one of the terminals 26—32'—33'—41—42 may be firmly anchored to resist mechanical shock, without disturbing the electrical connection to the particular terminal involved. For purposes of mounting to a chassis, suitably tapped inserts 46—47 may be embedded in spaced bores in the base of the yoke 10; for this purpose, depending upon the yoke material involved, tightly wound wire coils 46—47 may be embedded in bores in the base of the yoke 10, thereby defining the securing threads.

In the modification of Figs. 5 and 6, our invention is shown in application to the mounting of another type of disc tube 50, which may be of the multiple-grid variety as, for example, a pentode, in which case it is necessary to provide intermediate terminal-connection members 51 for a cathode, 52 for a first grid, 53 for a second grid, and 54 for a third grid. Terminal connections for the anode and filament of the device may be as described for Figs. 1 to 4 and are therefore given the same reference numerals. Since the tube 50 is more elongated than for the case of Figs. 1 to 4, the spaced sides 11'—12' of the yoke 10' are correspondingly more elongated. Connection members 51—53 in Figs. 5 and 6 are shown to be of the variety described at 37—38 in the case of Figs. 1 to 4. They thus may be of tempered wire, supported in both side legs of the yoke, and having separate external circuit-connection portions 55—56 projecting beyond opposite sides 11'—12' of the yoke 10'.

In order that the isolation between circuit connections to the remaining terminal connectors 52—54 may be as effective as possible, we show the provision of offsetting arms 57—58 formed integrally with the side arms 11'—12', respectively, and projecting out opposite sides of the general plane of the yoke 10'. Preferably, both offsetting arms 57—58 project to overstand opposite portions of the central opening 13' of the yoke. For the arrangement shown, tube insertion is made from the upper side shown in Fig. 6 and is suggested by the phantom outline 60. To facilitate tube insertion, a portion of the side arm 58 is shown cut away at 61, thereby providing adequate clearance for reception of a tube 60.

The terminal member 54, which contacts the top grid element of the tube 50, is shown to comprise a single tempered wire, supported at the end 62 in the side arm 12', and at the circuit-connection end 63 in the offset arm 57. In a similar manner, the terminal member 52 for the first grid of tube 50 includes one end supported at 64 in the side arm 11', and a circuit-connection end 65 anchored in and extending externally of the offset arm 58. All circuit-connection members 51—52—53—54 for intermediate electrode connections are shown having substantially arcuate portions to embrace their respective electrode terminals on the tube 50, and all such bowed arcuate portions are in complete register, facing out the insertion side of the central opening.

It will be seen that we have described a relatively simple tube mount for disc-type vacuum tubes, featuring extreme ruggedness and complete symmetry of preloaded axially aligned retaining forces. The symmetry is assured not only by the manner in which the anode and filament connections are made, but also by the structure of the yoke itself, in that its full peripherally continuous rigid structure is available for supporting the axial preloading forces. Furthermore, the intermediate electrode connections provide greatest arcs of cathode and grid contact and are such as to apply predominantly diametrically opposed forces at the tube-element connections, so that no net radial force is applied to the tube.

While we have described the invention in detail for the preferred forms shown, it will be understood that modifications may be made within the scope of the invention as described in the claims which follow.

We claim:

1. A holder for a vacuum tube having longitudinally opposed end-electrode terminals and a circumferentially extending continuous intermediate-electrode connection, comprising a peripherally continuous yoke of non-conducting material defining an opening to receive the longitudinal ends of an inserted tube and spanning opposed diametrical sides of the tube, separate terminal-connection elements supported on opposed longitudinal ends of said yoke for direct contact with the end-electrode terminals of the tube, and an intermediate-electrode connection supported on diametrically opposed portions of the sides of said yoke and including an extensive arcuate continuous portion for extensive arcuate contact with the intermediate-electrode connection of the tube.

2. A tube holding device, comprising a generally rectangular yoke having a central opening of a size to receive a disc-type vacuum tube between the longitudinal ends of said opening and with the axis of said tube oriented to span said ends, conducting terminal-connection members carried by said ends of said yoke for axially thrusting contact with the end-electrode terminals of an inserted tube, and a terminal-connection member carried by one of the sides of said yoke and having an extensively arcuate portion within said opening for extensively arcuate contact with the intermediate electrode terminal of the inserted tube.

3. A tube-holding device, comprising a generally rectangular yoke defining an opening of a size to receive a disc-type vacuum tube between the longitudinal ends of said opening and with the axis of said tube oriented to span said ends, conductive terminal-connection members carried by said ends of said yoke for axially thrusting end contact with the end-electrode terminals of an inserted tube, and a plurality of axially spaced intermediate terminal-connection members carried by the sides of said yoke, said intermediate members each having an extensively arcuate portion within said opening for extensively arcuate contact with an intermediate electrode terminal of said tube.

4. A mount for a disc-type vacuum tube, comprising a generally rectangular yoke defining an opening within two longitudinally extending sides connected by end-closure sides, an anode-connection contact carried within said opening at one of said ends for contact with the anode terminal of an inserted disc-type tube, two heater-connection members carried at the other end of said opening for contact with the heater terminals of said tube, and two intermediate-electrode connection members carried by said yoke, each of said intermediate connection members being of resilient conductive material and comprising an extensively arcuate portion within said opening, both arcuate portions facing out the same side of said opening.

5. A mount for a disc-type vacuum tube, comprising a generally rectangular yoke defining an opening within two longitudinally extending sides connected by end-closure sides, an anode-connection contact carried within said opening at one of said end-closure sides for contact with the anode terminal of an inserted disc-type tube, two heater-connection members carried at the other end-closure side of said opening for contact with the heater terminals of said tube, and two intermediate-electrode connection members carried by said yoke, each of said intermediate-connection members being of resilient conductive material and comprising an extensively arcuate portion within said opening, and facing out the same side of said opening, one of said intermediate-connection members including a portion projecting externally of one longitudinal side of said yoke to the exclusion of the other, the other of said intermediate-connection members including an externally projecting portion extending beyond the other longitudinal side of yoke to the exclusion of said one.

6. A mount according to claim 5, in which said other end-closure side includes an integral dividing ridge between said heater-connection terminals, whereby correct orientation of heater connections is assured for an inserted tube.

7. A mount according to claim 5, in which one of the sides of said yoke includes anchoring means projecting externally thereof.

8. A mount according to claim 5, in which one of the sides of said yoke has externally facing mounting bores therein.

9. A holder for a vacuum tube having longitudinally opposed end-electrode terminals and a circumferentially extending continuous intermediate-electrode connection, comprising a peripherally continuous yoke of non-conducting material defining an opening to receive the longitudinal ends of an inserted tube and spanning opposed diametrical sides of the tube in a first general plane, said yoke including an offset member extending out of said general plane and generally overstanding a part of said opening, separate terminal-connection elements supported on opposed longitudinal ends of said yoke for direct contact with the end-electrode terminals of the tube, and an intermediate-electrode connection element supported by said offset member and including an extensive arcuate continuous portion for extensive arcuate contact with the intermediate-electrode connection of the tube.

10. A holder according to claim 9, in which said intermediate-electrode connection element is also supported by one of the sides of said yoke.

11. A holder for a vacuum tube having longitudinally opposed end-electrode terminals and a circumferentially extending continuous intermediate-electrode connection, comprising a peripherally continuous yoke of non-conducting material defining an opening to receive the longitudinal ends of an inserted tube and spanning opposed diametrical sides of the tube in a first general plane, said yoke including an offset member extending out of said general plane and generally overstanding a part of said opening, separate terminal-connection elements supported on opposed longitudinal ends of said yoke for direct contact with the end-electrode terminals of the tube, and a plurality of axially spaced intermediate-electrode connection elements each of which includes an extensive arcuate continuous central portion within said opening for extensive arcuate contact with different intermediate-electrode connection of the tube, the opposed ends of one of said intermediate-connection elements being supported by opposite sides of said yoke, the opposed ends of another of said intermediate-connection elements being supported by said offset member and by one of said sides of said yoke.

12. A holder according to claim 11, in which the connection-element end supported by said offset member includes a part projecting externally of said offset member for electrical-circuit connection thereto.

13. A holder for a vacuum tube having longitudinally opposed end-electrode terminals and a circumferentially extending continuous intermediate-electrode connection, comprising a peripherally continuous yoke of non-conducting material defining an opening to receive the longitudinal ends of an inserted tube and spanning opposed diametrical sides of the tube in a first general plane, said yoke including an offset member extending out of said general plane and generally overstanding a part of said opening, separate terminal-connection elements supported on opposed longitudinal ends of said yoke for direct contact with the end-electrode terminals of the tube, and a plurality of axially spaced intermediate-electrode connection elements each of which includes an extensive arcuate continuous central portion within said opening for extensive arcuate contact with a different intermediate-electrode connection of the tube, the opposed ends of one of said intermediate-connection elements being supported by opposite sides of said yoke, the opposed ends of a second of said intermediate-connection elements being also supported by said opposite sides of said yoke, the opposed ends of a third of said intermediate-connection elements being supported by said offset member and by one of the sides of said yoke, there being for each of said intermediate-connection elements a single externally accessible end projecting outwardly of a part of said yoke for electrical-circuit connection thereto, one of said externally accessible ends projecting outwardly of said offset member, and each of the other of said externally accessible ends projecting outwardly of opposite sides of said yoke.

14. A holder according to claim 13, in which said yoke includes a second offset member extending out of said general plane and generally overstanding a part of said opening opposite said first offset member, a fourth intermediate-connection element supported by said second offset member and by one of the sides of said yoke, and an externally accessible end on said fourth element and projecting outwardly of said second offset member.

References Cited in the file of this patent

UNITED STATES PATENTS

| | | |
|---|---|---|
| 1,922,047 | Hund | Aug. 15, 1933 |
| 2,349,629 | Lazich | May 23, 1944 |
| 2,524,004 | Wallace | Sept. 26, 1950 |

OTHER REFERENCES

Electronic Equipment Publication, February 1957, pp. 18 and 19.